United States Patent
Valsecchi et al.

(10) Patent No.: US 11,890,769 B2
(45) Date of Patent: Feb. 6, 2024

(54) ULTRASONIC KNIFE AND ULTRASONIC CUTTING SYSTEM

(71) Applicant: CERATIZIT COMO S.P.A., Alserio (IT)

(72) Inventors: Antonello Valsecchi, Alserio (IT); Bernardo Bezzola, Alserio (IT)

(73) Assignee: Ceratizit Como S.P.A., Alserio (IT)

( * ) Notice: Subject to any disclaimer, the term of this patent is extended or adjusted under 35 U.S.C. 154(b) by 406 days.

(21) Appl. No.: 17/415,114

(22) PCT Filed: Nov. 27, 2019

(86) PCT No.: PCT/EP2019/082701
§ 371 (c)(1),
(2) Date: Jun. 17, 2021

(87) PCT Pub. No.: WO2020/126364
PCT Pub. Date: Jun. 25, 2020

(65) Prior Publication Data
US 2022/0048214 A1    Feb. 17, 2022

(30) Foreign Application Priority Data
Dec. 17, 2018   (EP) .................................. 18212995

(51) Int. Cl.
| | | |
|---|---|---|
| *B26D 7/08* | (2006.01) | |
| *B26D 1/00* | (2006.01) | |
| *B26D 7/26* | (2006.01) | |
| *C22C 29/06* | (2006.01) | |
| *C22C 29/08* | (2006.01) | |

(52) U.S. Cl.
CPC ........... *B26D 7/086* (2013.01); *B26D 1/0006* (2013.01); *B26D 7/2614* (2013.01); *B26D 2001/002* (2013.01); *C22C 29/067* (2013.01); *C22C 29/08* (2013.01); *Y10S 83/956* (2013.01)

(58) Field of Classification Search
CPC ..... Y10T 83/929; Y10S 83/956; B26D 7/086; B26D 7/2614; B26D 1/0006; B26D 2001/002; C22C 29/067; C22C 29/08
See application file for complete search history.

(56) References Cited

U.S. PATENT DOCUMENTS 4,567,797 A * 2/1986 Folk ....................... B26D 7/086
                                                    83/13
5,695,510 A   12/1997 Hood
(Continued)

FOREIGN PATENT DOCUMENTS

CN      207387730 U    5/2018
JP        3706239 B2   10/2005

*Primary Examiner* — Phong H Nguyen
(74) *Attorney, Agent, or Firm* — Laurence A. Greenberg; Werner H. Stemer; Ralph E. Locher

(57) ABSTRACT

An ultrasonic knife has a cutting portion formed with at least one cutting edge and a fastening portion. The fastening portion has an external thread for connection to a sonotrode. The cutting portion and the fastening portion are formed in one piece from cemented carbide material. The cemented carbide material includes hard particles that are, at least predominantly, formed by tungsten carbide and a metallic binder. The external thread of the fastening portion has a thread pitch p and is shaped such that the root of the thread turns has a rounded shape with a root radius R of $0.2*p \leq R \leq 0.3*p$.

20 Claims, 5 Drawing Sheets

(56) References Cited

U.S. PATENT DOCUMENTS

| | | | | |
|---|---|---|---|---|
| 9,788,852 B2* | 10/2017 | Voic | ............ | A61B 17/14 |
| 9,839,796 B2* | 12/2017 | Sawada | ......... | A61B 17/320092 |
| 2009/0127145 A1* | 5/2009 | Nonaka | ............ | B26D 7/00 |
| | | | | 206/349 |
| 2009/0266217 A1* | 10/2009 | Nonaka | ............ | H01L 21/67092 |
| | | | | 83/881 |

* cited by examiner

ULTRASONIC KNIFE AND ULTRASONIC CUTTING SYSTEM

BACKGROUND OF THE INVENTION

Field of the Invention

The present invention relates to an ultrasonic knife and to an ultrasonic cutting system comprising and sonotrode and an ultrasonic knife.

For cutting of different materials such as foodstuff, textile material, leather, composite material or honeycomb structures, ultrasonic cutting systems are used in which a knife having at least one cutting edge is connected to a sonotrode transmitting ultrasound oscillations to the knife. Cutting of the material to be cut is effected by small oscillations of the knife in the ultrasound range relative to the material to be cut. Typically, the sonotrode (also called ultrasonic horn) has an internal thread into which an external thread of the ultrasonic knife is mounted to form a threading connection. The internal thread of the sonotrode is typically a metric standard ISO internal thread (according to ISO 5408) or a standard UTS internal thread (ANSI/ASME Unified Thread Standard).

In applications for cutting of foodstuff or the like, ultrasonic knives made from stainless steel are typically used. In applications requiring higher hardness and/or higher abrasion resistance, ultrasonic knives are used in which the cutting portion of the ultrasonic knife, which forms the at least one cutting edge, is made from cemented carbide material and the fastening portion of the ultrasonic knife having the external thread is made from steel. These two portions made from different materials are connected by means of soldering or brazing. However, there is a disadvantage in that the soldering or brazing connection has dampening effect on the ultrasonic oscillations and adversely affects the achievable frequencies and/or amplitudes of the oscillations.

The problem of the undesired dampening effect of the soldering or brazing connection can be overcome by forming the ultrasonic knife in one piece from cemented carbide material, i.e. with the cutting portion and the fastening portion of the ultrasonic knife formed in one piece (i.e. monolithically) from cemented carbide material. Cemented carbide material is a composite material consisting of hard ceramic particles embedded in a ductile metallic binder phase, wherein the amount of hard particles in weight percent is substantially larger than the amount of binder phase in weight percent. Typically, the hard ceramic particles can at least predominantly be formed from tungsten carbide (WC) and the metallic binder phase is a base alloy of at least one of cobalt (Co), nickel (Ni) and iron (Fe). Base alloy of a metal means that this metal is the main constituent of the alloy. However, such a solid construction of the ultrasonic knife in one piece from cemented carbide material comes along with an increased risk of material failure in the region of the fastening portion having the external thread.

SUMMARY OF THE INVENTION

It is an object of the present invention to provide an improved ultrasonic knife and an improved ultrasonic cutting system having a sonotrode for generating ultrasonic oscillations and an ultrasonic knife.

This object is solved by an ultrasonic knife as claimed. Further developments are specified in the dependent claims.

The ultrasonic knife has a cutting portion comprising at least one cutting edge and a fastening portion comprising an external thread for connection to a sonotrode. The cutting portion and the fastening portion are formed in one piece from cemented carbide material. The cemented carbide material comprises hard particles at least predominantly formed by tungsten carbide and a metallic binder. The external thread of the fastening section has a thread pitch p and is shaped such that the root of the thread turns has a rounded shape with a root radius R of $0.2*p \leq R \leq 0.3*p$. Since the cutting portion and the fastening portion are formed in one piece, i.e. monolithically, from cemented carbide material, negative influences which could arise from a soldering or brazing material are avoided. Due to the external thread of the fastening section having a large root radius, which is substantially increased as compared to a metric standard ISO internal thread or a standard UTS internal thread, failure of the cemented carbide material in the fastening section is reliably avoided. The large root radius significantly reduces concentration of tensile stress in the region of the external thread which is a major factor in material failure of the cemented carbide material.

The object is also solved by an ultrasonic knife as claimed. Further developments are specified in the dependent claims.

The ultrasonic knife has a cutting portion comprising at least one cutting edge and a fastening portion comprising an external thread for connection to a sonotrode. The cutting portion and the fastening portion are formed in one piece from cemented carbide material. The cemented carbide material comprises hard particles at least predominantly formed by tungsten carbide and a metallic binder. The cemented carbide material comprises: 5.5-13 wt.-% Co, preferably 6.5-11 wt.-% Co; a Cr content with a relation of Cr/Co in wt.-% of $0.04 \leq Cr/Co \leq 0.06$; a Mo content with a relation of Mo/Co in wt.-% of $0.02 \leq Mo/Co \leq 0.04$; a content of V and Cr in relation to Co in wt.-% of $0.04 \leq (V+Cr)/Co \leq 0.07$; unavoidable impurities of in total $\leq 0.15$ wt.-%, and the remainder WC. Since the cutting portion and the fastening portion are formed in one piece, i.e. monolithically, from cemented carbide material, negative influences which could arise from a soldering or brazing material are avoided. The Co content in the range from 5.5-13 wt.-% allows adapting the hardness and toughness of the ultrasonic knife to different materials to be cut, different lengths of the cutting portion and the like, as the toughness is increasing with increasing Co content and the hardness is increasing with decreasing Co content. The defined Cr/Co relation in combination with the Mo content with the relation Mo/Co of $0.02 \leq Mo/Co \leq 0.04$ achieves reliable reduction of grain growth during the metallurgical product process and advantageous resistance of the cemented carbide material against material failure in the region of the external thread of the fastening portion. In particular in combination with the very small amount of V as expressed by $0.04 \leq (V+Cr)/Co \leq 0.07$ in combination with the Cr content defined above this results in increased toughness and reduced brittleness such that the resistance to material failure in the region of the external thread of the fastening portion is significantly improved.

According to a further development the external thread of the fastening section has a thread pitch p and is shaped such that the root of the thread turns has a rounded shape with a root radius R of $0.2*p \leq R \leq 0.3*p$. The external thread of the fastening section having such a large root radius, which is substantially increased as compared to a metric standard ISO internal thread or a standard UTS internal thread, significantly reduces the risk of failure of the cemented carbide material in the fastening section. The large root radius significantly reduces concentration of tensile stress in the region of the external thread which is major factor in material failure of cemented carbide material. In particular the combination of the specific composition of the cemented carbide material with the enlarged root radius achieves a significantly reduced risk of material failure in the region of the external thread.

According to a further development the root radius R is in the range $0.24*p \leq R \leq 0.285*p$. In particular this range for the root radius R achieves a very good trade-off between the increased resistance of the cemented carbide material in the region of the external thread against material failure, on the one hand, and advantageous height of the thread flanks in the radial direction of the external thread, on the other hand.

According to a further development the external thread has a nominal thread diameter in the range from 3 mm to 13 mm. It was found that nominal thread diameters in this range allow reliable and stable connections for all the different lengths of the cutting portion. Preferably the nominal thread diameter can be in the range from 5 mm to 10 mm.

If the WC grains in the cemented carbide material have an average grain size in the range from 0.5-1.2 μm, particular advantageous properties of the ultrasonic knife are achieved, and material failure can be reliably prevented.

According to a further development the external thread is adapted to threadingly cooperate with a metric standard ISO internal thread in a sonotrode. The metric standard ISO internal thread is specified in the norm ISO 5408. In this case, the external thread of the ultrasonic knife can reliably be attached to a conventional sonotrode and no specifically adapted sonotrode is required.

According to a further development the external thread is adapted to threadingly cooperate with a standard UTS internal thread in a sonotrode. The standard UTS internal threads are defined in the ANSI/ASME standard. Also in this case, the external thread of the ultrasonic knife can reliably be attached to a conventional sonotrode and no specifically adapted sonotrode is required.

According to a further development at least the fastening portion has a surface having the characteristics of a surface which has been subjected to a particle beam. The treatment of the cemented carbide surface with a particle beam can be directly identified by corresponding tiny deformations at the surface and indirectly by a stress gradient in the cemented carbide material as a function of the distance from the surface. When the surface of the fastening portion is subjected to a particle beam, small surface defects in the surface of the cemented carbide material which are typical starting points for material failure become annealed such that the risk of material failure in the region of the external thread is further reduced.

According to a further development at least the fastening portion has a compressive stress level in a surface region. In particular, the fastening portion can have a stress gradient in the direction with increasing distance from the surface. The compressive stress level in the surface region, which can be achieved by treating the fastening portion with a particle beam of macroscopic particles, further reduces the risk of material failure in the region of the external thread.

The object is also solved by an ultrasonic cutting system comprising a sonotrode for generating ultrasonic oscillations having an internal thread and the above ultrasonic knife. The external thread of the ultrasonic knife is threadingly engaged with the internal thread of the sonotrode. The internal thread of the sonotrode has a minimum diameter $D_{min}$ defined by the thread crests of the internal thread. The external thread of the ultrasonic knife has a maximum root diameter $d_{max}$ defined by the transition from the root radius to the thread flanks, wherein $d_{max} \leq D_{min}$. The internal thread of the sonotrode can e.g. be a metric standard ISO internal thread or a standard UNC internal thread. In the case of $d_{max} \leq D_{min}$ the functionality of the thread connection is maintained in entirety despite the other adaptations to the thread design of the external thread in order to reduce the risk of material failure in the region of the fastening portion.

Further advantages and developments of the invention will become apparent from the following description of embodiments with reference to the drawings.

DETAILED DESCRIPTION OF THE INVENTION

An embodiment of the invention will now be described with reference to the drawings.

Figure 1:
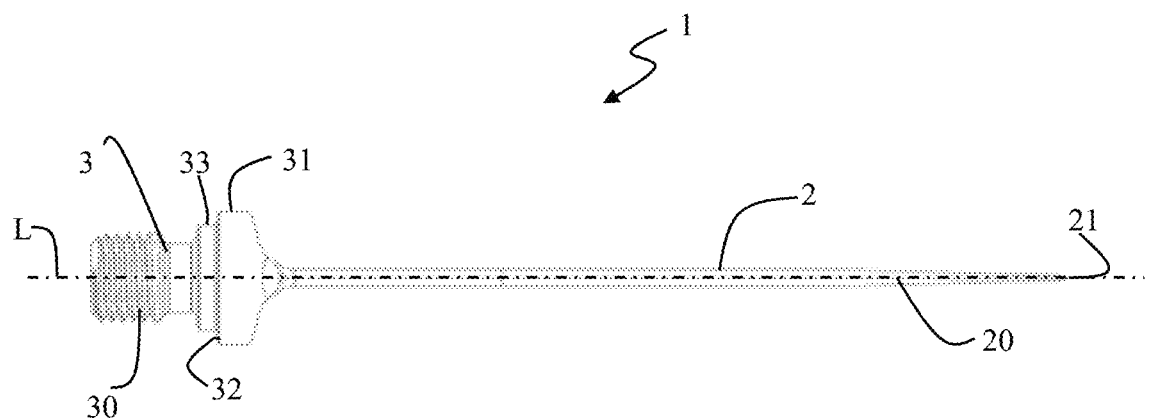
FIG. 1: is a schematic side view of an ultrasonic knife according to an embodiment.
Figure 3:
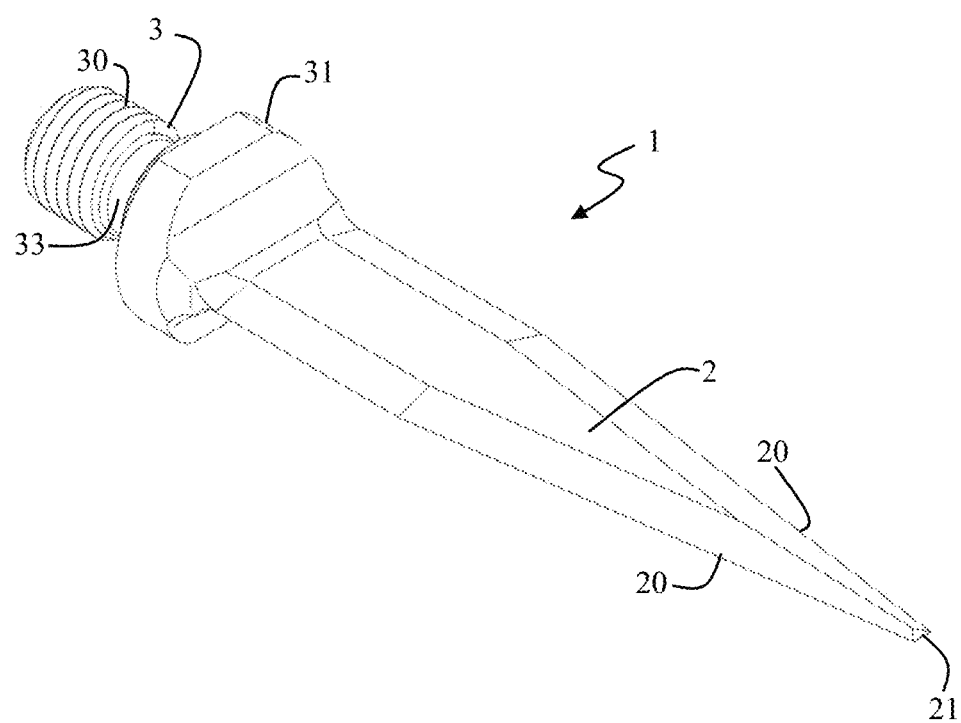
FIG. 3: is a schematic perspective illustration of the ultrasonic knife.

As can be seen in FIG. 1 and FIG. 3, the ultrasonic knife 1 according to the embodiment has a cutting portion 2 adapted to cut material to be cut on a first end and a fastening portion 3 for connecting the ultrasonic knife 1 to a sonotrode 10 on the other end. The cutting portion 2 has an elongated shape and tapers towards a cutting tip 21 formed at the first end of the ultrasonic knife 1, the first end facing away from the fastening portion 3. Cutting edges 20 are formed along the sides of the cutting portion 2. Although a specific shape of the cutting portion 2 is shown in FIG. 1 and FIG. 3, it should be noted that other shapes are also possible.

At the end facing away from the cutting portion 2, the fastening portion 3 of the ultrasonic knife 1 is provided with an external thread 30 the features of which will be described more in detail below. A substantially ring-shaped protrusion 31 which laterally projects further than the external thread 30 is formed between the cutting portion 2 and the external thread 30. The protrusion 31 has an annular axial abutment surface 32 which extends substantially perpendicular to a longitudinal axis L of the ultrasonic knife 1 and which is adapted to abut against a corresponding annular axial abutment surface 12 of the sonotrode 10.

A substantially cylindrical radial abutment surface 33 adjoins the annular axial abutment surface 32 in the direction towards the external thread 30. A substantially cylindrical clearance surface 34, having a smaller diameter than the radial abutment surface 33 and than the external thread 30, is formed between the radial abutment surface 33 and the external thread 30.

The whole ultrasonic knife 1, i.e. the cutting portion 2 and the fastening portion 3 having the external thread 30 are monolithically formed in one piece from cemented carbide material. The cemented carbide material comprises hard particles which are at least predominantly formed by tungsten carbide (WC) the space between which is filled by a ductile metallic binder. The specific composition of the cemented carbide material will be described further below. The specific shape of the cutting portion 2 is formed by grinding in order to achieve sharp cutting edges 20.

Figure 2:
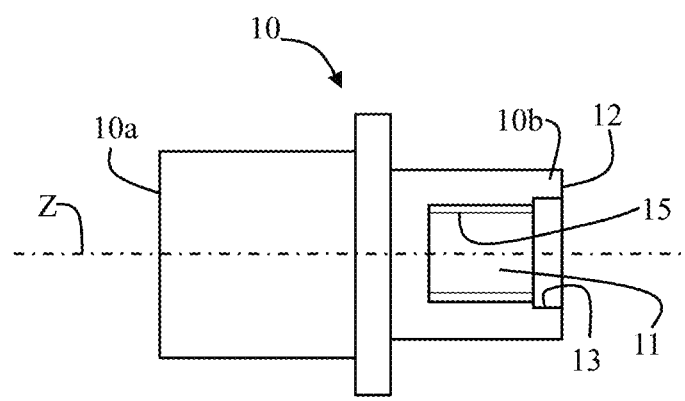
FIG. 2: is a schematic illustration of a sonotrode comprising an internal thread for cooperating with the external thread of the ultrasonic knife.

A typical sonotrode 10 will briefly be explained with reference to FIG. 2. The sonotrode 10 typically has a substantially cylinder symmetrical shape with a main axis Z. A first end 10a of the sonotrode 10 is adapted for connection to an interface of an ultrasound device (not shown). The second end 10b of the sonotrode 10 is provided with a central bore 11 adapted for receiving the fastening portion 3 of the ultrasonic knife 1. The central bore 11 is provided with an internal thread 15 which is a standard internal thread such as a metric standard ISO internal thread or a standard UTS internal thread. In the following, the features of the embodiment will be described with reference to an internal thread 15 being a UNJ standard internal thread.

The second end 10b of the sonotrode 10 has a substantially annular axial abutment surface 12 for supporting the annular axial abutment surface 32 of the ultrasonic knife 1. A substantially cylindrical radial abutment surface 13 is formed in the central bore 10 between the axial abutment surface 12 and the internal thread 15. The radial abutment surface 13 has a diameter which corresponds to the diameter of the cylindrical radial abutment surface 33 of the ultrasonic knife 1. When the ultrasonic knife 1 is connected to the sonotrode 10, the external thread 30 of the ultrasonic knife 1 is screwed into the internal thread 15 of the sonotrode 10 until the axial abutment surface 32 of the ultrasonic knife 1 abuts against the corresponding axial abutment surface 12 of the sonotrode 10. The ultrasonic knife 1 is centered in the radial direction (with regard to the longitudinal axis L) by interaction of the radial abutment surface 33 of the ultrasonic knife 1 with the radial abutment surface 13 of the sonotrode 10.

Next the shape of the external thread 30 of the fastening portion 3 will be described more in detail. First, cooperation of a UNJ standard external thread 30a with a UNJ standard internal thread will be described with reference to FIG. 4. Then, the difference of the external thread 30 according to the embodiment as compared to a standard external thread will be explained with reference to FIG. 5 and FIG. 6.

Figure 4:
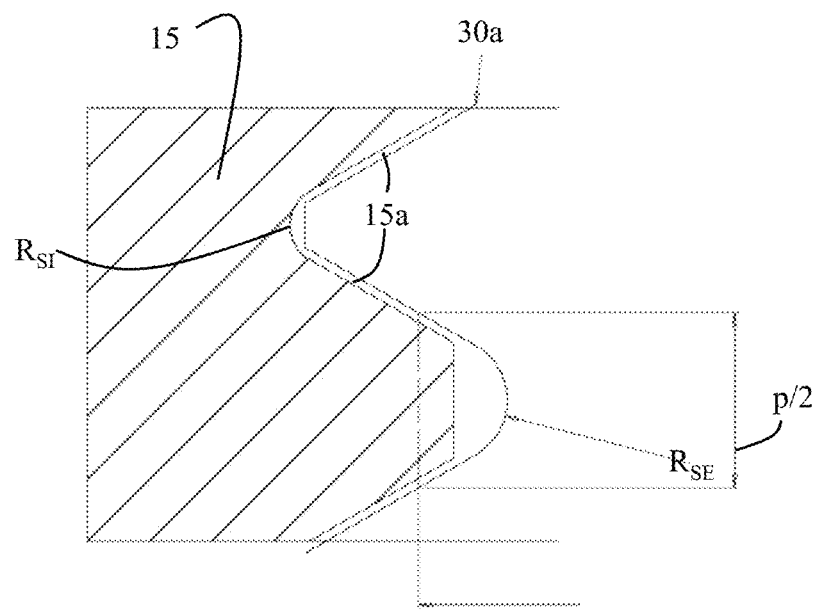
FIG. 4: is an enlarged illustration of an UNJ standard external thread cooperating with an UNJ standard internal thread.

As can be seen in FIG. 4, each thread turn of a standard internal thread 15 has a well-defined shape with a standard angle α formed between adjacent thread flanks 15a and with given root radius $R_{SI}$ of the internal thread 15. Similarly, the thread turns of a standard external thread 30a are also well-defined with regard to the angle between adjacent thread flanks and the root radius $R_{SE}$ of the external thread 30a. Further, the pitch p of the thread is clearly defined for standard threads (the half of the pitch p/2 being shown in FIG. 4).

Figure 5:
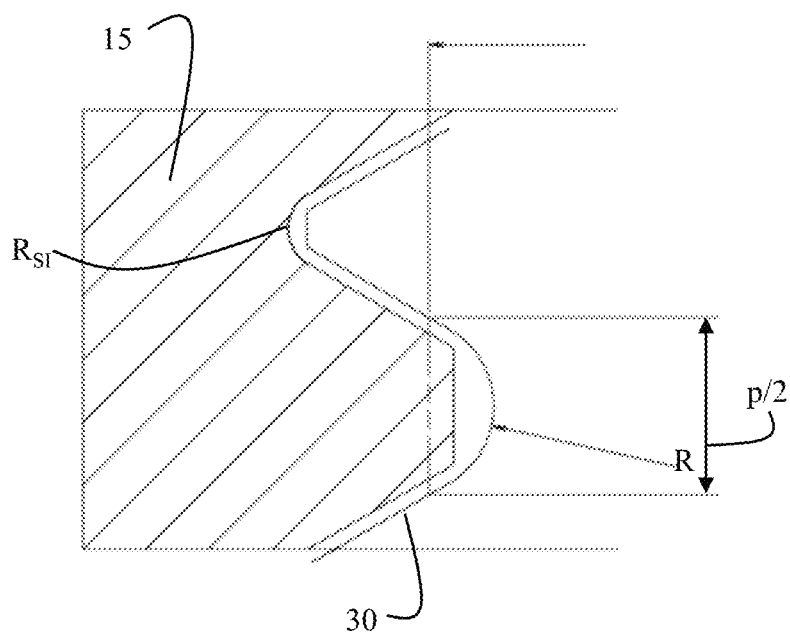
FIG. 5: is an enlarged illustration of the external thread of the ultrasonic knife according to an embodiment in cooperation with an UNJ standard internal thread of a sonotrode.

Turning now to FIG. 5 which illustrates an external thread 30 according to the embodiment in cooperation with the standard internal thread 15, it can be seen that the root 35 of the external thread 30 according to the embodiment has an increased root radius R as compared to the standard external thread 30a. The increased root radius R can best be expressed as a function of the pitch p of the thread connection. According to the embodiment, the external thread 30 of the ultrasonic knife 1 has a root radius R within the range of $0.2*p \leq R \leq 0.3*p$. In this way, the external thread 30 formed in the cemented carbide material of the ultrasonic knife 1 is made substantially more robust as compared to an external thread according to the standard. Preferably, the root radius can be in the range of $0.24*p \leq R \leq 0.285*p$. In has been found that the robustness of the external thread 30 formed in the cemented carbide material of the ultrasonic knife 1 can be substantially increased by selecting the root radius R as a function of the thread pitch p in this range. It has been found that this range works particularly well in the range of nominal thread diameters from approximately 3 mm to approximately 13 mm.

Figure 6:
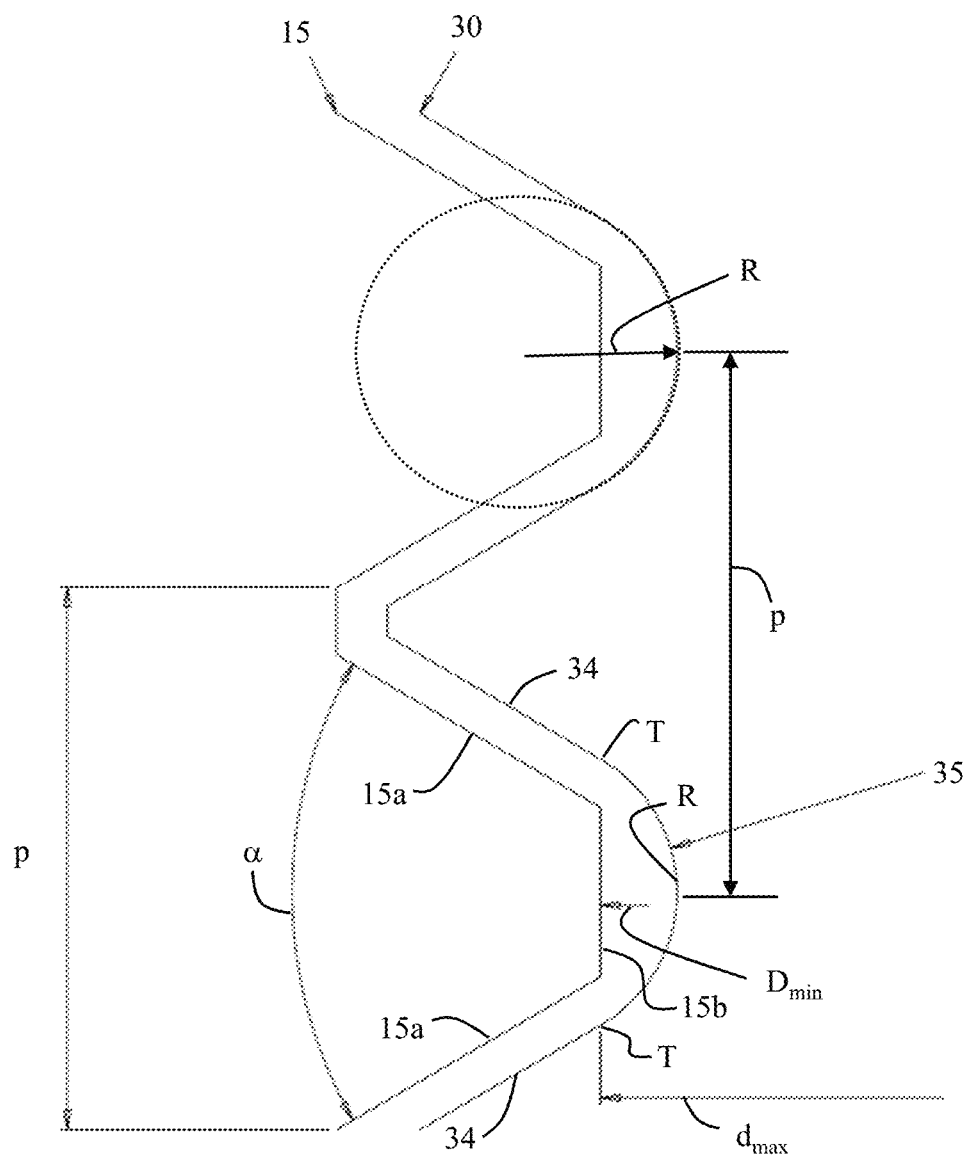
FIG. 6: is a further enlarged illustration of the external thread of the ultrasonic knife in cooperation with the internal thread of the sonotrode.

With reference to FIG. 6, it can be seen that the transitions T between the root 35 and the thread flanks 34, i.e. the transitions where the thread flanks 34 extend tangential to the root 35, define a maximum root diameter $d_{max}$ of the external thread 30. Further, the thread crests 15b of the internal thread 15 define a minimum diameter $D_{min}$. The external thread 30 according to the embodiment is adapted such that the maximum root diameter $d_{max}$ is smaller or equal to the minimum diameter $D_{min}$ of the internal thread 15 in the sonotrode 10. The sonotrode 10 and the ultrasonic knife 1 together form an ultrasonic cutting system. Although the features of the internal thread 15 and the specifically adapted cooperating external thread 30 were described above with reference to a UNJ standard thread, the same holds for metric standard ISO threads.

The ultrasonic knife 1 according to the embodiment is made from a cemented carbide material comprising: 5.5-13 wt.-% Co, a Cr content with a relation of Cr/Co in wt.-% of $0.04 \leq r/Co \leq 0.06$, a Mo content with a relation of Mo/Co in wt.-% of $0.02 \leq Mo/Co \leq 0.04$, a content of V and Cr in relation to Co in wt.-% of $0.04 \leq (V+Cr)/Co \leq 0.07$, unavoidable impurities of in total 0.15 wt.-%, and the remainder WC. The WC grains in the cemented carbide material have an average grain size in the range from 0.5 μm to 1.2 μm. Preferably, the cemented carbide material can have a Co content within the range from 6.5-11 wt.-% Co. The unavoidable impurities can in particular comprise TiC, TaC and/or NbC.

The cemented carbide material according to the invention was produced by powder metallurgy methods using WC powder having a particle size (Fisher sieve sizes; FSSS) of 0.6 μm, Co powder having an FSSS particle size of 0.8 μm, $Cr_3C_2$ powder having an FSSS particle size of 1.5 μm, $Cr_2N$ powder having an FSSS particle size of 1.5 μm, $Mo_2C$ powder having an FSSS particle size of 1.5 μm; and VC powder having an FSSS particle size of 1 μm, by mixing the respective powders in a solvent in a ball-mill/attritor and subsequent spray-drying in a conventional manner. The resulting granulate was compacted and shaped into a green body of the desired shape and was subsequently sintered in a conventional manner in order to obtain a sintered cemented carbide body. Ultrasonic knifes 1 were manufactured from the sintered cemented carbide bodies by grinding.

The fastening portion 3 of the ultrasonic knife 1 and in particular the external thread 30 was subjected to blasting treatment with a particle beam of alumina grid. The pressure of the particle beam was adjusted such that a compressive stress level was formed in a surface region of the cemented carbide material in the fastening portion 3 with a pressure gradient towards the interior of the fastening portion 3.

The average grain size of the tungsten carbide grains in the cemented carbide material was determined according to the "equivalent circle diameter (ECD)" method from EBSD (electron backscatter diffraction) images. This method is e.g. described in "Development of a quantitative method for grain size measurement using EBSD", Master of Science Thesis, Stockholm 2012, by Fredrik Josefsson.

Ultrasonic knives 1 made from different cemented carbide compositions were manufactured and tested against an ultrasonic knife according to a comparative example.

Example 1

Figure 7:
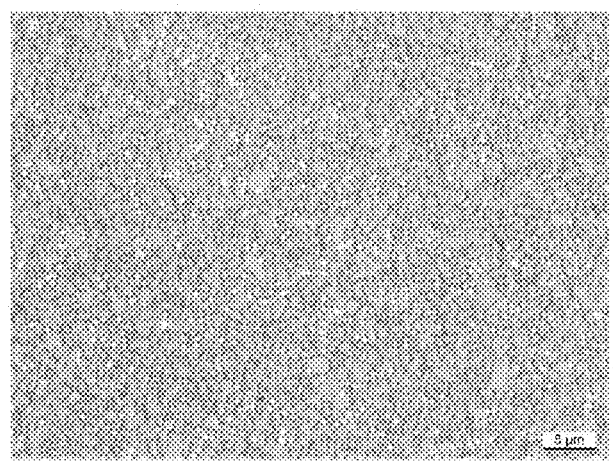
FIG. 7: is an SEM image of a cemented carbide material used for the ultrasonic knife in an Example 1.

An ultrasonic knife according to Example 1 was produced in one piece from a cemented carbide material of 6 wt.-% Co, 0.29 wt.-% Cr (corresponding to 0.35 wt.-% $Cr_3C_2$), 0.19 wt.-% Mo (corresponding to 0.2 wt.-% $Mo_2C$), 0.08 wt.-% V (corresponding to 0.1 wt.-% VC), remainder WC and unavoidable impurities (of less than 0.1 wt.-%) according to the above described production routine. Thus, the Cr/Co ratio was 0.048, the Mo/Co ratio was 0.032 and the (V+Cr)/Co ratio was 0.062. The average grain size of the WC grains was determined to be approx. 0.75 µm. An SEM image of the cemented carbide material is shown in FIG. 7. An external thread 30 was formed on the fastening portion 3 by grinding. The external thread 30 was based on a metric standard ISO external thread M10 with increased root radius R of R=0.26*p, i.e. (given the pitch p of 1.5 mm for M10) a root radius R of 0.39 mm.

Comparative Example

An ultrasonic knife was produced as a comparative example in one piece from a cemented carbide material consisting of 10 wt.-% Co, 0.42 wt.-% Cr (corresponding to 0.5 wt.-% $Cr_3C_2$), 0.16 wt.-% V (corresponding to 0.2 wt.-% VC), remainder WC and unavoidable impurities according to the above described production routine. The average grain size of the WC grains was approx. 0.7 µm. A metric standard ISO external thread M10 was formed on the fastening portion 3 by grinding.

Example 2

Figure 8:
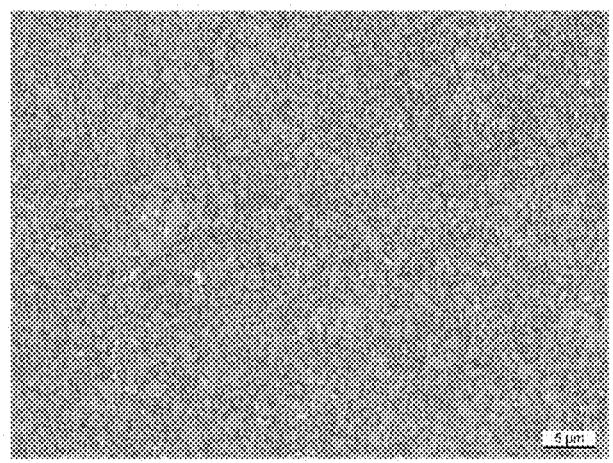
FIG. 8: is an SEM image of a cemented carbide material used for the ultrasonic knife in an Example 2.
Figure 9:
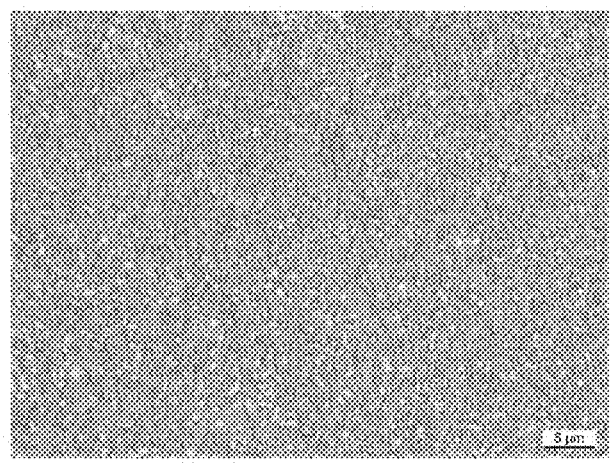
FIG. 9: is an SEM image of a cemented carbide material used for the ultrasonic knife in an Example 3.

An ultrasonic knife according to Example 2 was produced in one piece from a cemented carbide material of 7.5 wt.-% Co, 0.38 wt.-% Cr (corresponding to 0.45 wt.-% $Cr_3C_2$), 0.24 wt.-% Mo (corresponding to 0.25 wt.-% $Mo_2C$), 0.08 wt.-% V (corresponding to 0.1 wt.-% VC), remainder WC and unavoidable impurities (of less than 0.1 wt.-%) according to the above described production routine. Thus, the Cr/Co ratio was 0.051, the Mo/Co ratio was 0.032 and the (V+Cr)/Co ratio was 0.061. The average grain size of the WC grains was determined to be approx. 0.74 µm. An SEM image of the cemented carbide material is shown in FIG. 8. An external thread 30 was formed on the fastening portion 3 by grinding. The external thread 30 was based on a metric standard ISO external thread M10 with increased root radius R of R=0.24*p, i.e. (given the pitch p of 1.5 mm for M10) a root radius R of 0.36 mm.

Example 3

An ultrasonic knife according to Example 3 was produced in one piece from a cemented carbide material of 10 wt.-% Co, 0.46 wt.-% Cr (corresponding to 0.55 wt.-% $Cr_3C_2$), 0.28 wt.-% Mo (corresponding to 0.3 wt.-% $Mo_2C$), 0.12 wt.-% V (corresponding to 0.15 wt.-% VC), remainder WC and unavoidable impurities (of less than 0.15 wt.-%) according to the above described production routine. Thus, the Cr/Co ratio was 0.046, the Mo/Cr ratio was 0.028 and the (V+Cr)/Co ratio was 0.058. The average grain size of the WC grains was determined to be approx. 0.74 µm. An SEM image of the cemented carbide material is shown in FIG. 8. An external thread 30 was formed on the fastening portion 3 by grinding. The external thread 30 was based on a metric standard ISO external thread M10 with increased root radius R of R=0.24*p, i.e. (given the pitch p of 1.5 mm for M10) a root radius R of 0.36 mm.

Example 4

An ultrasonic knife according to Example 4 was produced in one piece from a cemented carbide material of 12 wt.-% Co, 0.58 wt.-% Cr (corresponding to 0.67 wt.-% $Cr_3C_2$), 0.31 wt.-% Mo (corresponding to 0.33 wt.-% $Mo_2C$), 0.10 wt.-% V (corresponding to 0.12 wt.-% VC), remainder WC and unavoidable impurities (of less than 0.15 wt.-%) according to the above described production routine. Thus, the Cr/Co ratio was 0.048, the Mo/Cr ratio was 0.026 and the (V+Cr)/Co ratio was 0.057. The average grain size of the WC grains was determined to be approx. 0.81 µm. An external thread 30 was formed on the fastening portion 3 by grinding. The external thread 30 was based on a metric standard ISO external thread M10 with increased root radius R of R=0.26*p, i.e. (given the pitch p of 1.5 mm for M10) a root radius R of 0.39 mm.

Ultrasonic knives according to the Comparative Example and to Examples 1 to 4 were mounted to sonotrodes 10 having a metric standard ISO external thread M10. The ultrasonic knives were then tested under harsh cutting conditions cutting honeycomb structure material for the aerospace industry. The cutting speed was continuously increased until breakage of the ultrasonic knife occurred.

The ultrasonic knives according to Examples 1 to 4 all achieved a substantially increased lifetime as compared to the Comparative Example. Further, the ultrasonic knives according to Examples 1 to 3 resulted in an even better surface quality of the cut material as compared to Example 4, which is believed to be due to the enhanced stiffness of the ultrasonic knives according to Examples 1 to 3.

The invention claimed is:

1. An ultrasonic knife, comprising:
   a cutting portion formed with at least one cutting edge and a fastening portion formed with an external thread for connection to a sonotrode;
   said cutting portion and said fastening portion being formed in one piece from cemented carbide material;
   said cemented carbide material comprising hard particles, at least predominantly formed by tungsten carbide, and a metallic binder; and
   said external thread of said fastening portion having a thread pitch p and thread turns with a root having a rounded shape with a root radius R being 0.2*p≤R≤0.3*p.

2. The ultrasonic knife according to claim 1, wherein said root radius R lies in a range 0.24*p≤R≤0.285*p.

3. The ultrasonic knife according to claim 1, wherein said external thread has a nominal thread diameter in a range from 3 mm to 13 mm.

4. The ultrasonic knife according to claim 3, wherein the nominal thread diameter of said external thread lies in a range from 5 mm to 10 mm.

5. The ultrasonic knife according to claim 1, wherein said cemented carbide material has WC grains with an average grain size in a range from 0.5 μm to 1.2 μm.

6. The ultrasonic knife according to claim 1, wherein said external thread is configured to threadingly mesh with a metric standard ISO internal thread in the sonotrode.

7. The ultrasonic knife according to claim 1, wherein said external thread is configured to threadingly mesh with a standard UTS internal thread in the sonotrode.

8. The ultrasonic knife according to claim 1, wherein said fastening portion has a surface with the characteristics of a surface that has been subjected to particle beam processing.

9. The ultrasonic knife according to claim 1, wherein said fastening portion has a given compressive stress level in a surface region.

10. An ultrasonic knife, comprising:
a cutting portion formed with at least one cutting edge and a fastening portion formed with an external thread for connection to a sonotrode;
said cutting portion and said fastening portion being formed in one piece from cemented carbide material;
said cemented carbide material comprising hard particles, at least predominantly formed by tungsten carbide, and a metallic binder, and said cemented carbide material being composed of:
5.5-13 wt.-% Co, preferably 6.5-11 wt.-% Co;
a Cr content with a ratio of Cr/Co in wt.-% of $0.04 \leq Cr/Co \leq 0.06$;
a Mo content with a ratio of Mo/Co in wt.-% of $0.02 \leq Mo/Co \leq 0.04$;
a content of V and Cr relative to Co in wt.-% of $0.04 \leq (V+Cr)/Co \leq 0.07$;
unavoidable impurities of in total $\leq 0.15$ wt.-%; and
remainder WC.

11. The ultrasonic knife according to claim 10, wherein said external thread of said fastening portion has a thread pitch p and thread turns with a root having a rounded shape with a root radius R being $0.2*p \leq R \leq 0.3*p$.

12. The ultrasonic knife according to claim 11, wherein said root radius R lies in a range $0.24*p \leq R \leq 0.285*p$.

13. The ultrasonic knife according to claim 10, wherein said external thread has a nominal thread diameter in a range from 3 mm to 13 mm.

14. The ultrasonic knife according to claim 10, wherein said cemented carbide material has WC grains with an average grain size in a range from 0.5 μm to 1.2 μm.

15. The ultrasonic knife according to claim 10, wherein said external thread is configured to threadingly mesh with a metric standard ISO internal thread in the sonotrode.

16. The ultrasonic knife according to claim 10, wherein said external thread is configured to threadingly mesh with a standard UTS internal thread in the sonotrode.

17. The ultrasonic knife according to claim 10, wherein said fastening portion has a surface with the characteristics of a surface that has been subjected to particle beam processing.

18. The ultrasonic knife according to claim 10, wherein said fastening portion has a given compressive stress level in a surface region.

19. An ultrasonic cutting system, comprising:
a sonotrode for generating ultrasonic oscillations, said sonotrode being formed with an internal thread; and
an ultrasonic knife according to claim 1;
said external thread of said ultrasonic knife being threadingly engaged with said internal thread of said sonotrode;
said internal thread of said sonotrode having a minimum diameter $D_{min}$ defined by thread crests of said internal thread;
said external thread of said ultrasonic knife having a maximum root diameter $d_{max}$ defined by a transition from the root radius R to adjoining thread flanks;
wherein $d_{max} \leq D_{min}$.

20. An ultrasonic cutting system, comprising:
a sonotrode for generating ultrasonic oscillations, said sonotrode being formed with an internal thread; and
an ultrasonic knife according to claim 10;
said external thread of said ultrasonic knife being threadingly engaged with said internal thread of said sonotrode;
said internal thread of said sonotrode having a minimum diameter $D_{min}$ defined by thread crests of said internal thread;
said external thread of said ultrasonic knife having a maximum root diameter $d_{max}$ defined by a transition from a root radius R to adjoining thread flanks;
wherein $d_{max} \leq D_{min}$.

* * * * *